US010471939B2

(12) United States Patent
Hara et al.

(10) Patent No.: US 10,471,939 B2
(45) Date of Patent: Nov. 12, 2019

(54) BRAKING CONTROL APPARATUS FOR VEHICLE

(71) Applicants: TOYOTA JIDOSHA KABUSHIKI KAISHA, Toyota-shi, Aichi-ken (JP); ADVICS CO., LTD., Kariya-shi, Aichi-ken (JP)

(72) Inventors: Masahiro Hara, Gotemba (JP); Yuji Yoshii, Mishima (JP); Yusaku Yamamoto, Tokai (JP); Hitoshi Terada, Nishio (JP); Takuya Nakano, Chiryu (JP); Shinya Akiba, Obu (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 49 days.

(21) Appl. No.: 15/802,938

(22) Filed: Nov. 3, 2017

(65) Prior Publication Data

US 2018/0141527 A1 May 24, 2018

(30) Foreign Application Priority Data

Nov. 24, 2016 (JP) ................................ 2016-228191

(51) Int. Cl.
*B60T 8/1766* (2006.01)
*B60T 8/18* (2006.01)
(Continued)

(52) U.S. Cl.
CPC ........ *B60T 8/1766* (2013.01); *B60T 8/17551* (2013.01); *B60T 8/18* (2013.01); *B60T 8/58* (2013.01)

(58) Field of Classification Search
CPC .. B60T 8/1766; B60T 8/1761; B60T 8/17551; B60T 8/1755; B60T 8/18; B60T 8/58
See application file for complete search history.

(56) References Cited

U.S. PATENT DOCUMENTS

2001/0013723 A1* 8/2001 Takemasa ............ B60T 8/1764 303/177
2004/0128052 A1* 7/2004 Nihei .................... B60T 8/1764 701/71

(Continued)

FOREIGN PATENT DOCUMENTS

JP 2010-284990 A 12/2010
JP 2012-96610 A 5/2012

*Primary Examiner* — Melody M Burch
(74) *Attorney, Agent, or Firm* — Oliff PLC

(57) ABSTRACT

A braking control apparatus performs right and left wheel independent control to approach a slip rate of a rear-right wheel and a rear-left wheel to a target slip rate as an average of slip rates of a front-right wheel and a front-left wheel. In a high-speed range, right and left wheel independent control is started when a deceleration is equal to or larger than a start value that is smaller than a start value used in a low-speed range. In right and left wheel independent control started in the high-speed range, when there is a demand to increase braking pressures of both the rear-right wheel and the rear-left wheel, the braking pressure of the rear wheel located on the outside during the occurrence of deflection of the vehicle resulting from braking is increased, and the braking pressure of the rear wheel located on the inside is prohibited from increasing.

10 Claims, 6 Drawing Sheets

(51) Int. Cl.
*B60T 8/1755* (2006.01)
*B60T 8/58* (2006.01)

(56) References Cited

U.S. PATENT DOCUMENTS

| | | | | |
|---|---|---|---|---|
| 2013/0204503 | A1 | 8/2013 | Watanabe | |
| 2014/0244128 | A1* | 8/2014 | Watanabe | B60T 8/1755 701/74 |
| 2014/0330501 | A1* | 11/2014 | Watanabe | B60T 8/1755 701/90 |

* cited by examiner

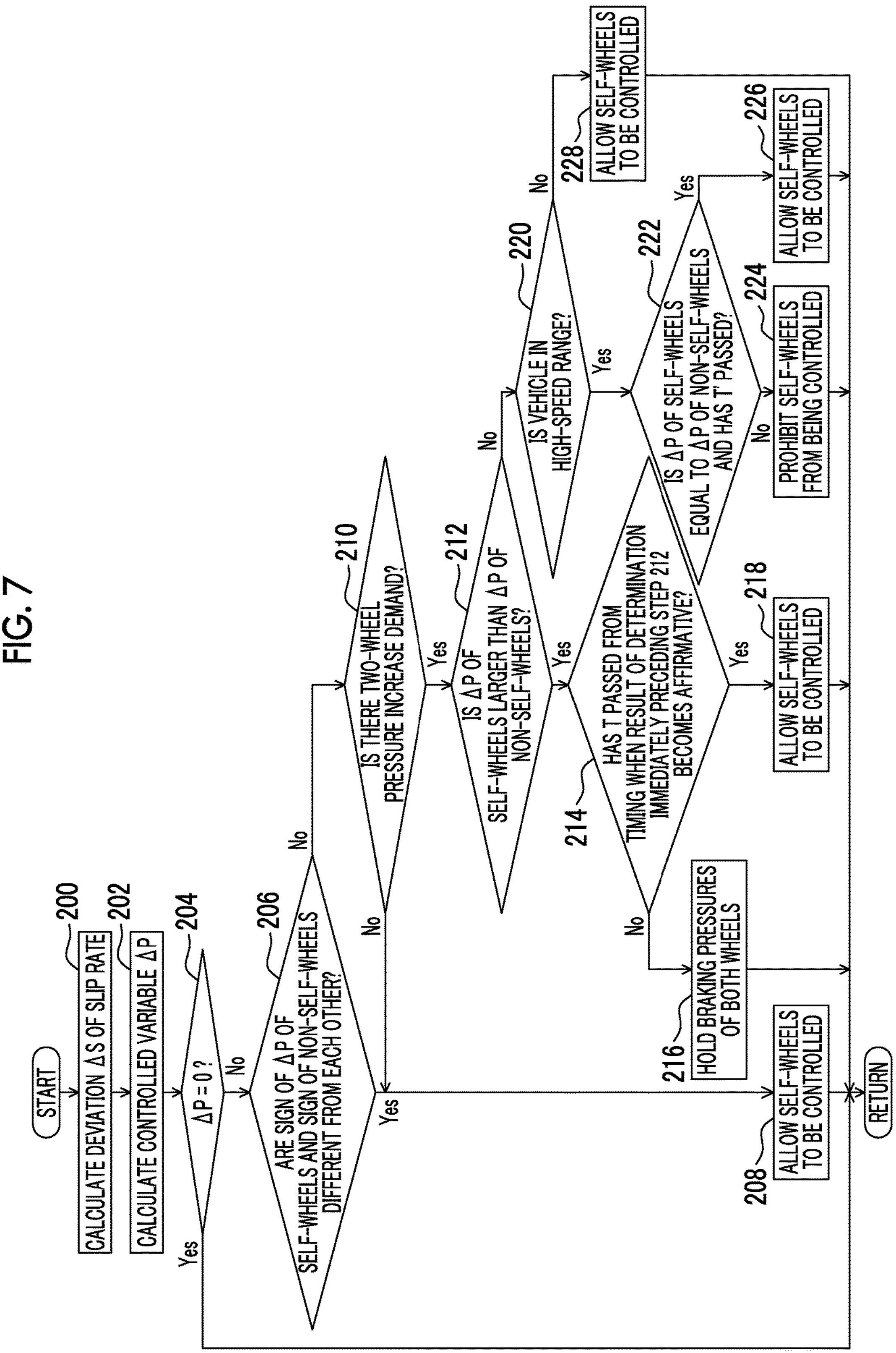
FIG. 7
START
200
CALCULATE DEVIATION ΔS OF SLIP RATE
202
CALCULATE CONTROLLED VARIABLE ΔP
204
ΔP = 0 ?
Yes
No
206
ARE SIGN OF ΔP OF SELF-WHEELS AND SIGN OF NON-SELF-WHEELS DIFFERENT FROM EACH OTHER?
Yes
No
208
ALLOW SELF-WHEELS TO BE CONTROLLED
210
IS THERE TWO-WHEEL PRESSURE INCREASE DEMAND?
Yes
No
212
IS ΔP OF SELF-WHEELS LARGER THAN ΔP OF NON-SELF-WHEELS?
Yes
No
214
HAS T PASSED FROM TIMING WHEN RESULT OF DETERMINATION IMMEDIATELY PRECEDING STEP 212 BECOMES AFFIRMATIVE?
Yes
No
216
HOLD BRAKING PRESSURES OF BOTH WHEELS
218
ALLOW SELF-WHEELS TO BE CONTROLLED
220
IS VEHICLE IN HIGH-SPEED RANGE?
Yes
No
222
IS ΔP OF SELF-WHEELS EQUAL TO ΔP OF NON-SELF-WHEELS AND HAS T' PASSED?
Yes
No
224
PROHIBIT SELF-WHEELS FROM BEING CONTROLLED
226
ALLOW SELF-WHEELS TO BE CONTROLLED
228
ALLOW SELF-WHEELS TO BE CONTROLLED
RETURN

BRAKING CONTROL APPARATUS FOR VEHICLE

INCORPORATION BY REFERENCE

The disclosure of Japanese Patent Application No. 2016-228191 filed on Nov. 24, 2016 including the specification, drawings and abstract is incorporated herein by reference in its entirety.

BACKGROUND

1. Technical Field

This disclosure relates to a braking control apparatus for a vehicle, and more particularly, to a braking control apparatus that is suited to control a vehicle in which right and left-wheel independent control for controlling braking pressures of a rear-right wheel and a rear-left wheel independently of each other is performed.

2. Description of Related Art

In Japanese Patent Application Publication No. 2012-096610 (JP 2012-096610 A), there is disclosed a vehicular braking force control apparatus capable of controlling braking pressures of a rear-right wheel and a rear-left wheel independently of each other. According to this control apparatus, a braking pressure of each of a rear-right wheel and a rear-left wheel is individually controlled such that a slip degree (i.e., a slip rate) of each of the rear wheels becomes equal to a target slip degree. This target slip degree is set lower than a slip degree of each of front wheels by a predetermined amount. Besides, the target slip degrees are corrected such that the target slip degree of the rear wheel on a grounding load increase side becomes higher than the target slip degree of the rear wheel on a grounding load decrease side.

SUMMARY

In general, the center of gravity of a vehicle is often offset either rightward or leftward from the center of the vehicle, and also changes as the number of passengers and the amount of load change. When the center of gravity of the vehicle is offset in this manner, a difference is created between the grounding load of each of the right wheels and the grounding load of each of the left wheels. In the case where the grounding load of each of the right wheels and the grounding load of each of the left wheels are different from each other, when the same braking force is applied to each of the right wheels and each of the left wheels, the vehicle tends to deflect toward the grounding load decrease side even if the steered wheels are located at straight traveling positions respectively. This is because of the following reason. The slip degree of each of the wheels during braking is inversely proportional to the grounding load thereof. Therefore, in the case where the grounding load of each of the right wheels and the grounding load of each of the left wheels are different from each other as a result of the offset of the position of the center of gravity of the vehicle from the center thereof, when the same braking force is applied to each of the right wheels and each of the left wheels, the wheel speed of each of the wheels on the grounding load decrease side is lower than the wheel speed of each of the wheels on the other side.

Thus, it is conceivable to perform right and left wheel independent control in such a manner as to control the braking pressures of the rear-right wheel and the rear-left wheel independently of each other such that the slip degree (e.g., the slip rate) of each of the rear-right wheel and the rear-left wheel becomes equal to a common target slip degree. According to this right and left wheel independent control, when the vehicle is braked with the grounding load of each of the right wheels and the grounding load of each of the left wheels different from each other as described above, the braking pressures of the rear-right wheel and the rear-left wheel can be controlled such that the braking force on the grounding load increase side becomes larger than the braking force on the grounding load decrease side. As a result, a yaw moment (a so-called anti-spin moment) for counterbalancing a yaw moment that tends to deflect the vehicle toward the grounding load decrease side can be applied to the vehicle. Thus, the braking stability of the vehicle can be enhanced.

It is conceivable to use the average of the slip degrees of the front-right wheel and the front-left wheel as the target slip degree of the above-mentioned right and left wheel independent control. It should be noted herein that when the braking force distribution to the front wheels and the rear wheels is close to an ideal braking force distribution curve, it is safe to conclude that the braking force of each of the rear wheels is appropriately enhanced. In this case, therefore, it is safe to conclude that there is a situation where the slip degrees of the rear wheels are likely to rise at the time of braking. In the situation where the slip degrees of the rear wheels are likely to rise, when the vehicle is braked with the grounding load of each of the right wheels and the grounding load of each of the left wheels different from each other as described above, a state where the target slip degree (i.e., the average of the slip degrees of the front-right wheel and the front-left wheel) is confined between the slip degrees of the rear-right wheel and the rear-left wheel is likely to be formed. According to right and left wheel independent control, when this state is formed, the braking force of the rear wheel on the grounding load increase side (i.e., the low slip degree side) is enhanced while the braking force of the rear wheel on the grounding load decrease side (i.e., the high slip degree side) is lowered. Accordingly, when the braking force distribution to the front wheels and the rear wheels is close to the ideal braking force distribution curve, an anti-spin moment is likely to be appropriately applied to the vehicle.

On the other hand, with a view to securing high braking stability of the vehicle in a high-speed range, it is conceivable to adopt characteristics in which the braking force distribution to the rear wheels is sufficiently reduced with respect to the ideal braking force distribution (referred to herein as "rear-wheel small braking force characteristics" for the sake of convenience). Under these rear-wheel small braking force characteristics, the slip degree of each of the rear wheels is less likely to rise at the time of braking than in the case where the braking force distribution to the front wheels and the rear wheels is close to the ideal braking force distribution curve. As a result, when right and left wheel independent control is performed with the average of the slip degrees of the front-right wheel and the front-left wheel adopted as the target slip degree under the rear-wheel small braking force characteristics, a state where the slip degree of each of the rear-right wheel and the rear-left wheel is lower than the target slip degree is likely to be formed. According to right and left wheel independent control, in this state, with a view to making the slip degree of each of the rear-right wheel and the rear-left wheel close to the target slip degree, a demand to increase the braking force of the rear wheel on the grounding load decrease side (the high slip degree side) as well as the braking force of the rear wheel on the grounding load increase side is likely to be made. When the braking forces of both the rear-right wheel and the rear-left wheel are increased in this manner through the adjustment of the braking pressures thereof, the enhancement of the deceleration performance of the vehicle can be expected, but there is an apprehension that it may become difficult to apply an effective anti-spin moment to the vehicle.

The disclosure provides a braking control apparatus for a vehicle that can favorably make the securement of braking stability of the vehicle and further enhancement of the deceleration performance compatible with each other in the case where rear-wheel small braking force characteristics are adopted to secure braking stability of the vehicle in a high-speed range, in the vehicle in which right and left wheel independent control is performed to control braking pressures of a rear-right wheel and a rear-left wheel independently of each other such that a slip degree of each of the rear-right wheel and the rear-left wheel approaches a target slip degree as an average of slip degrees of a front-right wheel and a front-left wheel.

An first aspect of the disclosure provides a braking control apparatus for a vehicle. The vehicle is equipped with a brake device configured to control braking pressures of a rear-right wheel and a rear-left wheel independently of each other. A control performed by the braking control apparatus includes performing right and left wheel independent control for controlling the braking pressures of the rear-right wheel and the rear-left wheel independently of each other such that a slip degree of each of the rear-right wheel and the rear-left wheel approaches a target slip degree as an average of slip degrees of a front-right wheel and a front-left wheel. The braking control apparatus is configured to start the right and left wheel independent control when a deceleration of the vehicle is equal to or larger than a first predetermined value in a low-speed range of the vehicle, and start the right and left wheel independent control when the deceleration is equal to or larger than a second predetermined value that is smaller than the first predetermined value in a high-speed range, the high-speed range being higher range in speed than the low-speed range. The right and left wheel independent control that is started in the high-speed range includes a braking pressure control process that increases the braking pressure of the rear wheel located on an outside during occurrence of deflection of the vehicle resulting from braking and that prohibits the braking pressure of the rear wheel located on an inside during occurrence of the deflection from being increased, when there is a demand to increase the braking pressures of both the rear-right wheel and the rear-left wheel.

In the first aspect of the disclosure, the braking control apparatus may be configured to hold the braking pressures of both the rear-right wheel and the rear-left wheel until a predetermined time passes from a time point of reversal of a deflection direction of the vehicle, when the deflection direction of the vehicle is reversed during performance of the right and left wheel independent control in the high-speed range.

In the first aspect, the braking control apparatus may be configured to increase the braking pressure of a target one of the rear wheels whose braking pressure is to be increased through the braking pressure control process, within such a range that a braking force of the target one of the rear wheels does not exceed an ideal braking force distribution regarding braking forces of the front-right wheel and the front-left wheel and braking forces of the rear-right wheel and the rear-left wheel.

In the first aspect, the braking control apparatus may be configured to determine that a speed of the vehicle is in the low-speed range when the speed of the vehicle is lower than a predetermined speed, and determine that the speed of the vehicle is in the high-speed range when the speed of the vehicle is equal to or higher than the predetermined speed.

In the first aspect, the braking control apparatus may be configured to, when the deflection direction of the vehicle is reversed during performance of the right and left wheel independent control in the high-speed range, increase a braking force of the rear wheel located on the outside during occurrence of deflection of the vehicle after reversal of the deflection direction of the vehicle, and prohibit the braking pressure of the rear wheel located on the inside during occurrence of deflection after reversal of the deflection direction from being increased, after the predetermined time passes from the time point of reversal of the deflection direction.

A second aspect of the disclosure provides a braking control apparatus for a vehicle. The vehicle is equipped with a brake actuator configured to control braking pressures of a rear-right wheel and a rear-left wheel independently of each other. The braking control apparatus includes an electronic control unit that is electrically connected to the brake actuator. The electronic control unit is configured to perform right and left wheel independent control for controlling the braking pressures of the rear-right wheel and the rear-left wheel independently of each other such that a slip degree of each of the rear-right wheel and the rear-left wheel approaches a target slip degree as an average of slip degrees of a front-right wheel and a front-left wheel, through use of the brake actuator. The electronic control unit is configured to start the right and left wheel independent control when a deceleration of the vehicle is equal to or larger than a first predetermined value in a low-speed range of the vehicle, and start the right and left wheel independent control when the deceleration is equal to or larger than a second predetermined value that is smaller than the first predetermined value in a high-speed range, the high-speed range being higher range in speed than the low-speed range, and the right and left wheel independent control that is started in the high-speed range includes a braking pressure control process that increases the braking pressure of the rear wheel located on an outside during occurrence of deflection of the vehicle resulting from braking and that prohibits the braking pressure of the rear wheel located on an inside during occurrence of the deflection from being increased, when there is a demand to increase the braking pressures of both the rear-right wheel and the rear-left wheel.

In the second aspect, the electronic control unit may be configured to hold the braking pressures of both the rear-right wheel and the rear-left wheel until a predetermined time passes from a time point of reversal of a deflection direction of the vehicle, when the deflection direction of the vehicle is reversed during performance of the right and left wheel independent control in the high-speed range.

In the second aspect, the electronic control unit may be configured to increase the braking pressure of a target one of the rear wheels whose braking pressure is to be increased through the braking pressure control process, within such a range that a braking force of the target one of the rear wheels does not exceed an ideal braking force distribution regarding braking forces of the front-right wheel and the front-left wheel and braking forces of the rear-right wheel and the rear-left wheel.

In the second aspect, the electronic control unit may be configured to determine that a speed of the vehicle is in the low-speed range when the speed of the vehicle is lower than a predetermined speed, and determine that the speed of the vehicle is in the high-speed range when the speed of the vehicle is equal to or higher than the predetermined speed.

In the second aspect, the electronic control unit may be configured to, when the deflection direction of the vehicle is reversed during performance of the right and left wheel independent control in the high-speed range, increase a braking force of the rear wheel located on the outside during occurrence of deflection of the vehicle after reversal of the deflection direction of the vehicle, and prohibit the braking pressure of the rear wheel located on the inside during occurrence of deflection after reversal of the deflection direction from being increased, after the predetermined time passes from the time point of reversal of the deflection direction.

According to the disclosure, right and left wheel independent control is performed to control the braking pressures of the rear-right wheel and the rear-left wheel independently of each other such that the slip degree of each of the rear-right wheel and the rear-left wheel approaches the target slip degree as the average of the slip degrees of the front-right wheel and the front-left wheel. In the high-speed range of the vehicle, this right and left wheel independent control is started as soon as the deceleration (the second predetermined value) that is smaller than the deceleration (the first predetermined value) of the vehicle at the time when right and left wheel independent control is started in the low-speed range is reached. Thus, an environment in which the rear-wheel small braking force characteristics (the characteristics in which the braking force distribution to the rear wheels is sufficiently reduced with respect to the ideal braking force distribution) can be realized can be created. In addition, according to the disclosure, right and left wheel independent control that is started in the high-speed range includes the braking pressure control process. According to the braking pressure control process, when there is a demand to increase the braking pressures of both the rear-right wheel and the rear-left wheel, the braking pressure of the rear wheel located on the outside during the occurrence of deflection of the vehicle resulting from braking is increased, and the braking pressure of the rear wheel located on the inside during the occurrence of the deflection is prohibited from being increased. According to this braking pressure control process, the deceleration performance can be enhanced through an increase in the braking force of one of the rear wheels while securing braking stability of the vehicle by effectively (stably) generating an anti-spin moment for reducing the amount of deflection of the vehicle. Thus, the securement of braking stability of the vehicle and further enhancement of the deceleration performance can be favorably made compatible with each other in the case where right and left wheel independent control in which the above-mentioned target slip degree is used and the rear-wheel small braking force characteristics are adopted is performed in the high-speed range.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein:

FIG. 7 is a flowchart showing a subroutine of a processing procedure regarding right and left-wheel independent control in step 108 shown in FIG. 6.

DETAILED DESCRIPTION OF EMBODIMENT

First Embodiment

[Configuration of First Embodiment]

Figure 1:
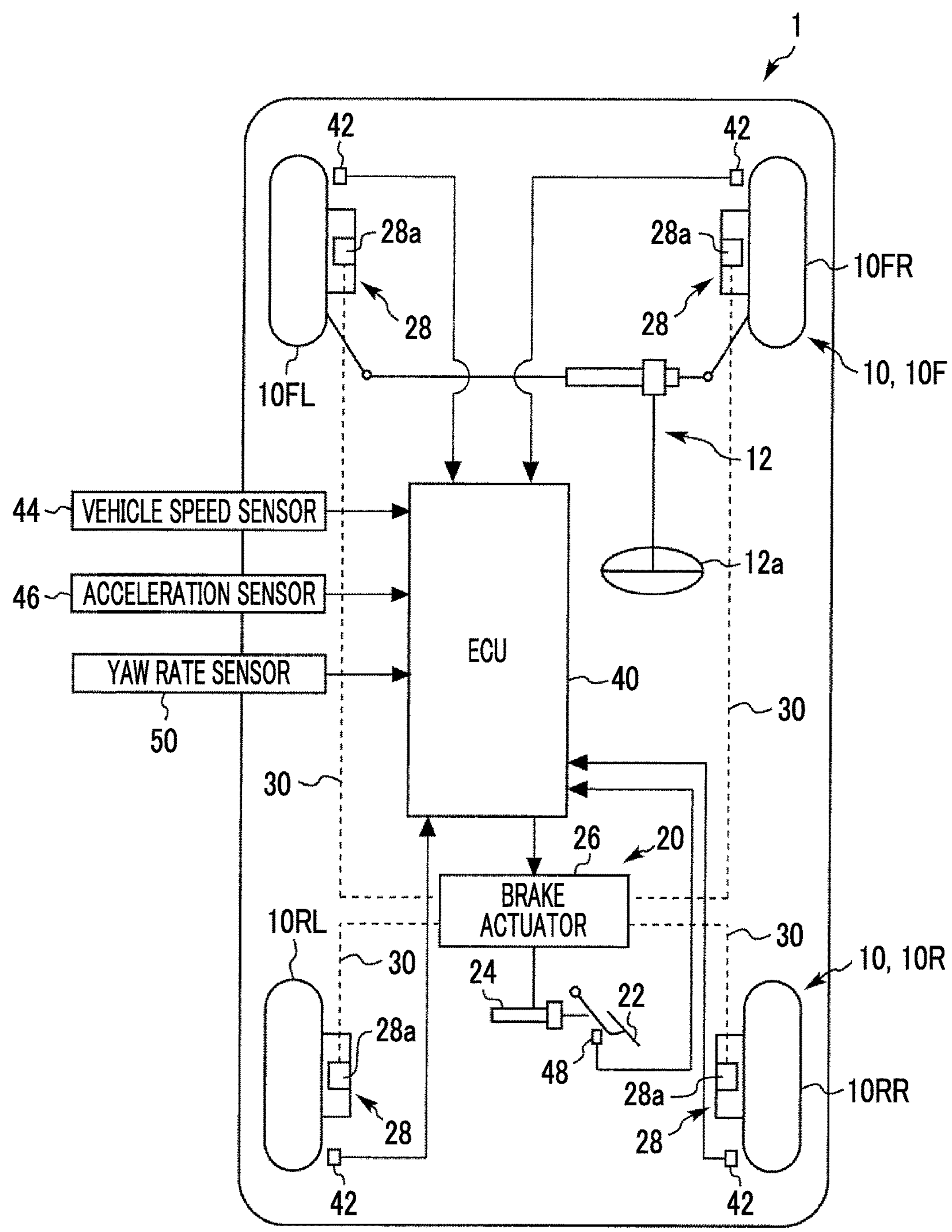
FIG. 1 is a schematic view representing an exemplary configuration of a vehicle to which a braking control apparatus according to the first embodiment of the disclosure is applied.

FIG. 1 is a conceptual view representing an exemplary configuration of a vehicle 1 to which a braking control apparatus according to the first embodiment of the disclosure is applied. As shown in FIG. 1, the vehicle 1 according to the present embodiment of the disclosure is equipped with four wheels 10. In the following description, the front-right wheel, the front-left wheel, the rear-right wheel, and the rear-left wheel will be denoted by 10FR, 10FL, 10RR, and 10RL respectively. Besides, the front wheels may be comprehensively denoted by 10F, and the rear wheels may be comprehensively denoted by 10R.

The vehicle 1 is equipped with a steering device 12 having a steering wheel 12*a*. The steering device 12 is configured to change the direction of the front wheels 10F as steered wheels of the vehicle 1, in accordance with the operation of the steering wheel 12*a* by a driver.

The vehicle 1 is equipped with a brake device 20. The brake device 20 includes a brake pedal 22, a master cylinder 24, a brake actuator 26, brake mechanisms 28, and hydraulic piping structures 30. The master cylinder 24 generates a hydraulic pressure corresponding to a depression force of the brake pedal 22, and supplies the generated hydraulic pressure to the brake actuator 26.

The brake actuator 26 has a hydraulic circuit (not shown) that is interposed between the master cylinder 24 and the brake mechanisms 28. The hydraulic circuit is equipped with a pump for boosting a brake hydraulic pressure without depending on a master cylinder pressure, a reservoir for storing a brake fluid, and a plurality of electromagnetic valves.

The brake mechanisms 28 are connected to the brake actuator 26 via the hydraulic piping structures 30 respectively. The brake mechanisms 28 are arranged in the wheels

10 respectively. The brake actuator 26 distributes brake hydraulic pressures to the brake mechanisms 28 of the wheels 10 respectively. More specifically, the brake actuator 26 can supply brake hydraulic pressures to the brake mechanisms 28 of the wheels 10 respectively, with the master cylinder 24 or the aforementioned pump serving as a pressure source. The brake mechanisms 28 have wheel cylinders 28*a* respectively, which operate in accordance with the supplied brake hydraulic pressures respectively.

Furthermore, the brake actuator 26 can adjust the brake hydraulic pressures applied to the wheels 10 independently of one another, by controlling the various electromagnetic valves with which the aforementioned hydraulic circuit is equipped. More specifically, the brake actuator 26 has a pressure increase mode for increasing the pressure, a hold mode for holding the pressure, and a pressure reduction mode for reducing the pressure, as control modes of the brake hydraulic pressures. The brake actuator 26 can make the control modes of the brake hydraulic pressures for the wheels 10 different from one another, by controlling the ON/OFF states of the various electromagnetic valves. Braking forces applied to the wheels 10 are determined in accordance with the brake hydraulic pressures (i.e., braking pressures) supplied to the wheel cylinders 28*a*, respectively. Therefore, through this change in the control mode, the brake actuator 26 can control the braking forces of the respective wheels 10 independently of one another by controlling the braking pressures of the respective wheels 10 independently of one another.

The braking control apparatus according to the present embodiment of the disclosure is equipped with an electronic control unit (an ECU) 40 on the vehicle 1. Various sensors and the brake actuator 26 are electrically connected to the ECU 40. The various sensors mentioned herein include wheel speed sensors 42, a vehicle speed sensor 44, an acceleration sensor 46, a brake depression force sensor 48, and a yaw rate sensor 50. The wheel speed sensors 42 are arranged in the wheels 10 respectively, and output wheel speed signals corresponding to rotational speeds of the wheels 10 respectively. The vehicle speed sensor 44 outputs a vehicle body speed signal corresponding to a vehicle body speed (a vehicle speed). The acceleration sensor 46 outputs an acceleration signal corresponding to an acceleration of the vehicle 1 in a longitudinal direction thereof. The brake depression force sensor 48 outputs a brake depression force signal corresponding to a depression force of the brake pedal 22. The yaw rate sensor 50 outputs a yaw rate signal corresponding to a yaw rate of the vehicle 1.

The ECU 40 is equipped with a processor, a memory, and an input/output interface. The input/output interface acquires sensor signals from the various sensors that are attached to the vehicle 1, and outputs an operation signal to the brake actuator 26. Various control programs and maps for controlling the brake actuator 26 are stored in the memory. The processor reads out a control program from the memory and executes the control program, and the function of the braking control apparatus is thereby realized.

[Braking Control According to First Embodiment]

(Outline of Right and Left Wheel Independent Control as Premise)

Figure 2:
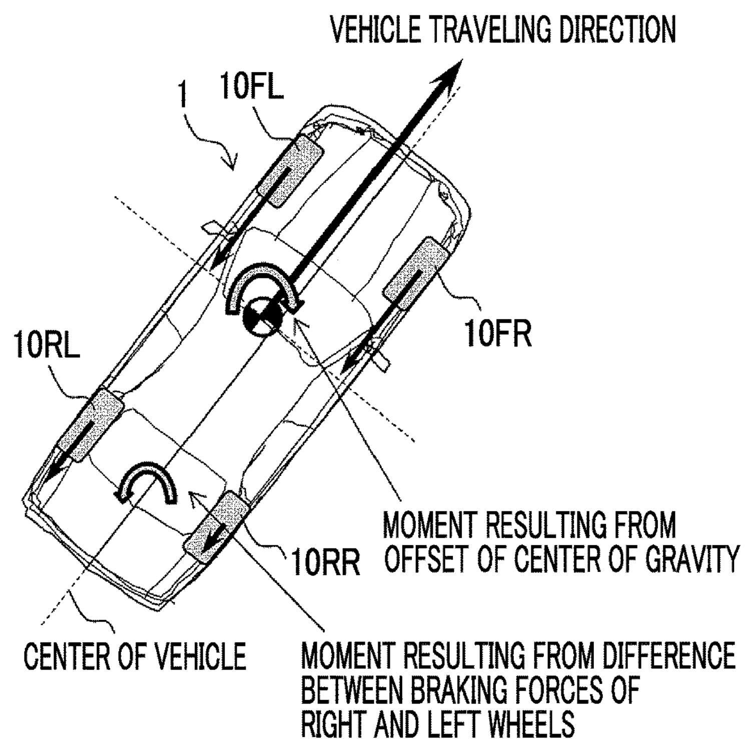
FIG. 2 is a conceptual view for illustrating right and left-wheel independent control according to the first embodiment of the disclosure.
Figure 3:
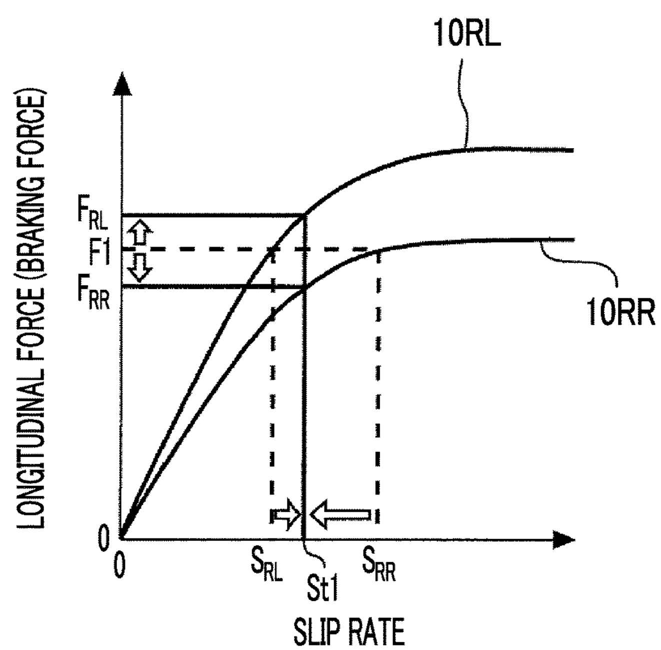
FIG. 3 is a view for illustrating an example of adjustment of braking pressures of a rear-right wheel and a rear-left wheel through right and left-wheel independent control according to the first embodiment of the disclosure.

FIG. 2 is a conceptual view for illustrating right and left wheel independent control according to the first embodiment of the disclosure. FIG. 3 is a view for illustrating an example of adjustment of braking pressures of the rear-right wheel 10RR and the rear-left wheel 10RL through right and left wheel independent control according to the first embodiment of the disclosure, and represents a relationship between longitudinal forces (i.e., braking forces) of the rear-right wheel 10RR and the rear-left wheel 10RL and the slip rates S thereof at the time of braking.

In the present embodiment of the disclosure, with a view to securing braking stability of the vehicle 1, “right and left wheel independent control” is utilized targeting the rear-right wheel 10RR and the rear-left wheel 10RL. According to this right and left wheel independent control, the braking pressures of the rear-right wheel 10RR and the rear-left wheel 10RL are controlled independently of each other, such that the slip rate S of each of the rear-right wheel 10RR and the rear-left wheel 10RL becomes equal to a common target slip rate St. In the present embodiment of the disclosure, an average of the slip rates S of the front-right wheel 10FR and the front-left wheel 10FL is used as the target slip rate St.

Each of the slip rates S of the wheels 10 can be calculated according to the following equation (1), based on, for example, each of wheel speeds Vw detected by the wheel speed sensors 42 and a vehicle body speed V detected by the vehicle speed sensor 44. Incidentally, the vehicle body speed V may be estimated through the use of, for example, a known method that is based on the wheel speeds Vw detected by the wheel speed sensors 42 and a deceleration of the vehicle 1 detected by the acceleration sensor 46, instead of utilizing the vehicle speed sensor 44.

[Mathematical Expression 1]

$$S=V-Vw/V\times 100 \quad (1)$$

In general, the center of gravity of the vehicle is often offset from a center of the vehicle in a lateral direction thereof as in an example shown in FIG. 2, and also changes as the number of passengers or the amount of load changes. FIG. 2 represents a situation where the vehicle 1 is braked with the center of gravity thereof is offset in the lateral direction thereof. When the center of gravity of the vehicle 1 is offset in this manner, the grounding loads of the right wheels 10 and the left wheels 10 are different from each other respectively. In the case where the grounding loads of the right wheels 10 and the left wheels 10 are different from each other respectively, when the same braking force is applied to the right wheels 10 and the left wheels 10, the wheel speeds of the wheels 10 on the grounding load decrease side (the front-right wheel 10FR and the rear-right wheel 10RR) are lower than the wheel speeds of the wheels on the other side (the front-left wheel 10FL and the rear-left wheel 10RL) respectively. As a result, as indicated by broken lines in FIG. 3, when a same braking force F1 is applied to the rear-right wheel 10RR and the rear-left wheel 10RL, a slip rate $S_{RR}$ of the rear-right wheel 10RR on the grounding load decrease side is higher than a slip rate $S_{RL}$ of the rear-left wheel 10RL on the grounding load increase side. Incidentally, although FIG. 3 represents the characteristics of the rear-right wheel 10RR and the rear-left wheel 10RL, the same as in FIG. 3 holds true for the relationship between the front-right wheel 10FR and the front-left wheel 10FL.

As described above, even in the case where the same braking force is applied to the right wheels 10 and the left wheels 10 at the time of braking, the slip rates S of the left wheels 10FL and 10RL and the slip rates S of the right wheels 10FR and 10RR become different from each other respectively, and a moment resulting from the offset of the center of gravity (a clockwise moment shown in FIG. 2) is generated in the vehicle 1. As a result, as is the case with the example shown in FIG. 2, even when the steered wheels (the front wheels 10F) are located at straight traveling positions respectively, the vehicle 1 tends to deflect toward the grounding load decrease side (toward the right side in the example shown in FIG. 2).

In the case where the vehicle is braked with the grounding loads of the right wheels 10 and the left wheels 10 different from each other respectively as described above, the following effect is obtained by applying right and left wheel independent control according to the present embodiment of the disclosure. It should be noted herein that an example in which a value St1 between the slip rate $S_{RR}$ of the rear-right wheel 10RR and the slip rate $S_{RL}$ of the rear-left wheel 10RL is used as shown in FIG. 3 will be described as an example of the target slip rate St of right and left wheel independent control.

In the example shown in FIGS. 2 and 3, the braking pressures of the rear-right wheel 10RR and the rear-left wheel 10RL are controlled independently of each other, such that the slip rate S of each of the rear-right wheel 10RR and the rear-left wheel 10RL becomes equal to the common target slip rate St1, through the performance of right and left wheel independent control. Thus, the braking force of the rear-left wheel 10RL as the wheel on the grounding load increase side (i.e., on the outside of the turning resulting from a moment based on the offset of the center of gravity) is increased from F1 to $F_{RL}$ to enhance the slip rate S. On the other hand, the braking force of the rear-right wheel 10RR as the wheel on the grounding load decrease side (i.e., on the inside of the aforementioned turning) is reduced from F1 to F to lower the slip rate S.

More specifically, the controlled variable ΔP of each of the braking pressures resulting from right and left wheel independent control is determined in accordance with a deviation ΔS (=St−S) between the target slip rate St and the actual slip rate S, in such a manner as to increase as the deviation ΔS increases. The deviation ΔS assumes a positive value when there is a pressure increase demand to increase the braking pressure, and assumes a negative value when there is a pressure reduction demand to reduce the braking pressure. Accordingly, the controlled variable ΔP (the positive value) increases as the deviation ΔS increases when there is a pressure increase demand, and the controlled variable (the negative value) increases (on the negative side) as the deviation ΔS increases (on the negative side) when there is a pressure reduction demand.

According to right and left wheel independent control, a difference is given between the braking forces of the rear-right wheel 10RR and the rear-left wheel 10RL in such a manner that the braking force of the rear-left wheel 10RL on the grounding load increase side is increased above the braking force of the rear-right wheel 10RR on the grounding load decrease side as described above. As a result, a moment resulting from this difference between the right wheel and the left wheel (a counterclockwise moment shown in FIG. 2) is generated in the vehicle 1. This moment serves as a yaw moment (a so-called anti-spin moment) for counterbalancing the moment resulting from the offset of the center of gravity. Thus, the braking stability of the vehicle 1 can be enhanced. The right and left wheel independent control described above is equivalent to one version of electronic brake force distribution (EBD) for appropriately controlling the distribution of braking forces to the respective wheels 10 in accordance with the situation of the vehicle 1.

Incidentally, as is apparent from the characteristics shown in FIG. 3, even in the case where a comparison is made based on any arbitrary value of the slip rate S other than the target slip rate St1, the braking force of the wheel (10RL) on the grounding load increase side is larger than the braking force of the wheel (10RR) on the grounding load decrease side. Accordingly, when a difference is given between the braking forces of the rear-right wheel 10R and the rear-left wheel 10R during the performance of right and left wheel independent control, an anti-spin moment tends to be generated in the vehicle 1 even if the target slip rate St is not between the slip rates $S_{RL}$ and $S_{RL}$ as is the case with St1. It should be noted, however, that when the target slip rate St is between the slip rate S of the rear-right wheel 10RR and the slip rate $S_{RL}$ of the rear-left wheel 10RL as in the example shown in FIG. 3, an anti-spin moment is more effectively generated because the braking force of the rear wheel 10R on the grounding load decrease side (i.e., on the inside of the turning (deflection) of the vehicle 1) is reduced while the braking force of the rear wheel 10R on the grounding load increase side (on the outside of the aforementioned turning) is increased.

(Problem of Right and Left Wheel Independent Control in High-Speed Range)

Figure 4:
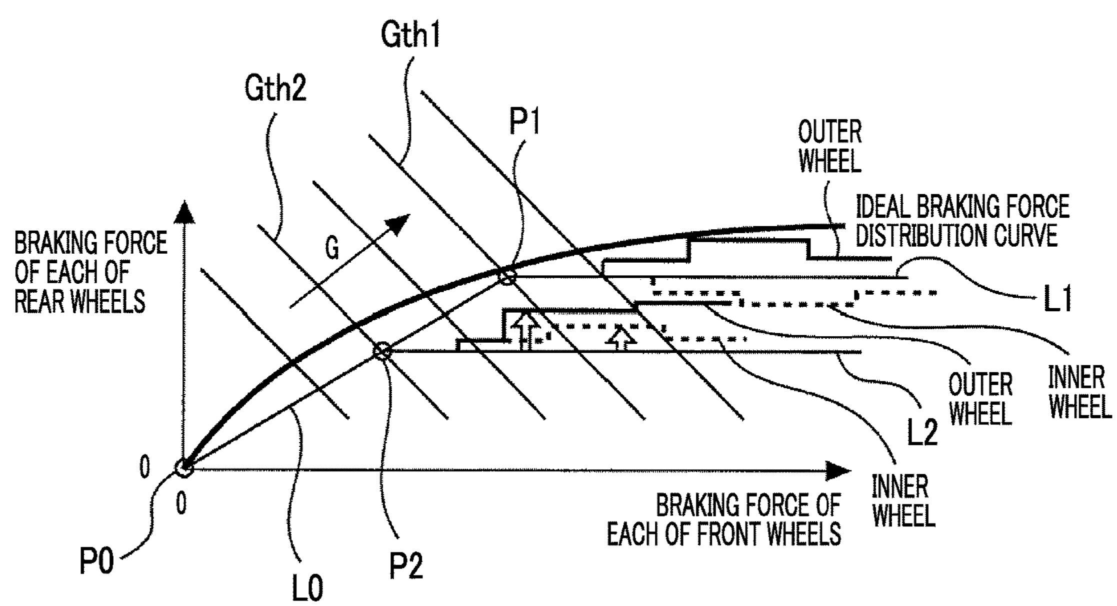
FIG. 4 is a view representing a relationship between braking forces of front wheels and braking forces of the rear wheels.

FIG. 4 is a view representing a relationship between the braking forces of the front wheels 10F and the braking forces of the rear wheels 10R. A parabola in FIG. 4 is an ideal braking force distribution curve representing an ideal distribution of braking forces to the front wheels 10 and the rear wheels 10. More particularly, the ideal distribution of braking forces is a distribution of braking forces in which the front wheels 10F of the vehicle 1 and the rear wheels 10R of the vehicle 1 are simultaneously locked. The braking performance of the vehicle 1 can be enhanced by making the actual distribution of braking forces close to this ideal braking force distribution curve. Lines other than the ideal braking force distribution curve in FIG. 4 represent actual braking force distribution lines, except a line representing a deceleration G.

A straight line L0 that links an origin P0 and a point P1 with each other in FIG. 4 is an actual braking force distribution line that is used when right and left wheel independent control is not performed. The point P1 is equivalent to a point on the actual braking force distribution line L0 where the deceleration G of the vehicle 1 is equal to Gth1. In the present embodiment of the disclosure, when the vehicle speed (vehicle body speed) V is in a low-speed range, a setting for starting right and left wheel independent control as soon as the deceleration G reaches Gth1 (hereinafter referred to as "a low-speed setting") is used. The deceleration G at the time when right and left wheel independent control with the low-speed setting is started will be referred to hereinafter simply as "a control start value Gth1". According to right and left wheel independent control, when the slip rate S of each of the rear-right wheel 10RR and the rear-left wheel 10RL becomes equal to the target slip rate St, each of the braking forces applied to the rear-right wheel 10RR and the rear-left wheel 10RL is held. A straight line L1 is equivalent to an actual braking force distribution line in the case where the braking force of each of the rear-right wheel 10RR and the rear-left wheel 10RL is held equal to a magnitude at the point P1, in a situation where the deceleration G increases above G1 under this low-speed setting.

The point P1 is located close to the ideal braking force distribution curve. Therefore, according to the low-speed setting, it is safe to conclude that right and left wheel independent control can be performed with the braking forces of the rear wheels 10R appropriately enhanced. When the braking forces of the rear wheels 10R are enhanced, it is safe to conclude that there is a situation where the slip rates S of the rear wheels 10R are likely to rise at the time of braking. In the case where there is a situation where the slip rates S of the rear wheels 10 are likely to rise through the use of the low-speed setting, when the vehicle is braked with the grounding loads of the rear-right wheel 10R and the rear-left wheel 10R different from each other respectively as described above, a state where the target slip rate St (i.e., the average of the slip rates S of the front-right wheel 10FR and the front-left wheel 10FL) is confined between the slip rate S ($S_{RR}$) of the rear-right wheel 10RR and the slip rate S ($S_{RL}$) of the rear-left wheel 10RL (hereinafter referred to as "a state C1" for the sake of convenience) is likely to be formed.

According to right and left wheel independent control, when the above-mentioned state C1 is formed, the braking force of an outer wheel (i.e., the rear wheel on the grounding load increase side) 10R is enhanced while the braking force of an inner wheel (i.e., the rear wheel on the grounding load decrease side) 10R is lowered. Accordingly, when the distribution of braking forces to the front wheels 10 and the rear wheels 10 is close to the ideal braking force distribution curve, an anti-spin moment is likely to be appropriately applied to the vehicle 1. Incidentally, FIG. 4 represents an example of such adjustment of the braking forces of the rear-right wheel 10RR and the rear-left wheel 10RL, namely, an example in which a difference is given between the braking forces of the right and left wheels such that the braking force of the inner wheel 10R is lowered while the braking force of the outer wheel 10R is enhanced with respect to the actual braking force distribution line L1.

In the present embodiment of the disclosure, in a high-speed range that is higher in speed than the low-speed range where the low-speed setting is used, a setting for starting right and left wheel independent control as soon as the deceleration G reaches a deceleration Gth2 smaller than Gth1 (hereinafter referred to simply as "a control start value Gth2") (hereinafter referred to as "a high-speed setting") is used. A point P2 in FIG. 4 is equivalent to a point on the actual braking force distribution line L0 where the deceleration G of the vehicle 1 is equal to G2. This G2 is equivalent to an example of the control start value Gth2 that is used under the high-speed setting. More specifically, in the present embodiment of the disclosure, a value that differs depending on the vehicle speed V (more particularly, a value that decreases as the vehicle speed V rises) is used as the control start value Gth2 that is used under the high-speed setting. G2 is equivalent to one of a plurality of such control start values Gth2.

A straight line L2 is equivalent to an actual braking force distribution line in the case where the braking force applied to each of the rear-right wheel 10RR and the rear-left wheel 10RL is held equal to the magnitude at the point P2, in a situation where the deceleration G increases above the control start value Gth2 under the high-speed setting. As described above, the control start value Gth2 that is used under the high-speed setting is smaller than the control start value Gth1 that is used under the low-speed setting. As shown in FIG. 4, the actual braking force distribution line L2 can realize characteristics in which the braking forces distributed to the rear wheels 10R are more sufficiently reduced with respect to the ideal braking force distribution than the actual braking force distribution line L1 for low speeds (hereinafter referred to as "rear-wheel small braking force characteristics"). According to these rear-wheel small braking force characteristics, the cornering power of each of the rear wheels 10R during braking can be restrained from decreasing, so the braking stability of the vehicle 1 can be further enhanced.

Under the above-mentioned rear-wheel small braking force characteristics, the slip rate S of each of the rear wheels 10R is less likely to rise due to a smaller braking force than in the case where the braking force distribution of the front wheels 10 and the rear wheels 10 is close to the ideal braking force distribution curve. As a result, when right and left wheel independent control is performed with the average of the slip rates S of the front-right wheel 10FR and the front-left wheel 10FL set as the target slip rate St under the rear-wheel small braking force characteristics, a state where each of the slip rates S of both the rear-right wheel 10RR and the rear-left wheel 10RL is lower than the target slip rate St (hereinafter referred to as "a state C2" for the sake of convenience) is likely to be formed.

According to right and left wheel independent control, in the aforementioned state C2, with a view to making the slip rate S of each of the rear-right wheel 10RR and the rear-left wheel 10RL close to the common target slip rate St, a demand to increase the braking force of the inner wheel (the rear wheel on the grounding load decrease side) 10R as well as the braking force of the outer wheel (the rear wheel on the grounding load increase side) 10R is likely to be made as in the example shown in FIG. 4. When the braking forces of both the rear-right wheel 10RR and the rear-left wheel 10RL are increased in this manner through the adjustment of the braking pressures thereof, the enhancement of the deceleration performance of the vehicle 1 can be expected. However, there is an apprehension that an effective anti-spin moment may be unlikely to be applied to the vehicle 1 even when there is a difference between the braking force of the rear-right wheel 10RR and the rear-left wheel 10RL.

(Characteristic Control of First Embodiment)

In the present embodiment of the disclosure, in view of the above-mentioned problem in the high-speed range, when a demand to increase the braking forces of both the rear-right wheel 10RR and the rear-left wheel 10RL is made during the performance of right and left wheel independent control in the high-speed range (hereinafter referred to simply as "high-speed EBD"), a determination is made on the direction of deflection of the vehicle 1 resulting from braking. The braking forces of the respective wheels 10 are controlled through the adjustment of the braking pressures thereof. Therefore, the demand to increase the braking forces of both the rear-right wheel 10RR and the rear-left wheel 10RL is referred to herein as "a two-wheel pressure increase demand". In the present embodiment of the disclosure, when there is a two-wheel pressure increase demand during the performance of high-speed EBD, the braking pressures of the rear wheels 10R are controlled according to the following method. That is, the braking pressure of the rear wheel 10R located on the outside during the occurrence of deflection of the vehicle 1 is increased, and the braking pressure of the rear wheel 10R located on the inside during the occurrence of the deflection is prohibited from being increased.

Figure 5:
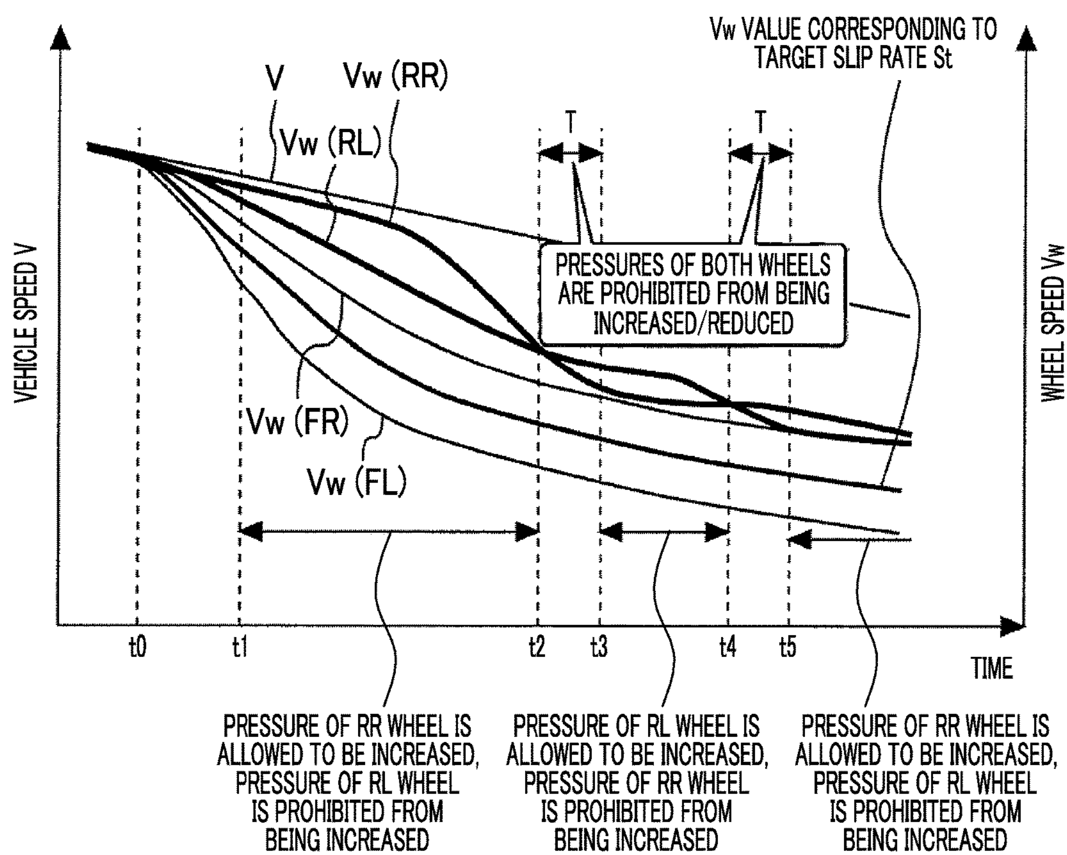
FIG. 5 is a time chart for illustrating the outline of the control that is performed to control the braking pressures of the rear wheels when there is a two-wheel pressure increase demand during the performance of right and left-wheel independent control in a high-speed range.

FIG. 5 is a time chart for illustrating the outline of the control of the braking pressures of the rear wheels 10R that is performed when there is a two-wheel pressure increase demand during the performance of high-speed EBD. The axes of ordinate in FIG. 5 indicate the vehicle speed V (the estimated vehicle body speed) and the wheel speed Vw of each of the wheels 10 respectively. A waveform that is indicated as a wheel speed value corresponding to the target slip rate St in FIG. 5 is equivalent to a waveform of the average of the wheel speeds Vw of the front-right wheel 10FR and the front-left wheel 10FL.

In FIG. 5, the vehicle 1 is assumed to be in a situation where the grounding loads of the right and left wheels 10 are different from each other respectively in such a manner that the grounding loads of the right wheels 10 are larger than the grounding loads of the left wheels 10 respectively as a result of a deviation of the center of gravity (the opposite situation of the example shown in FIG. 2). A time point t0 in FIG. 5 is equivalent to a time point when the braking of the vehicle 1 in this situation is started. When the same braking forces are applied to the right wheels 10 and the left wheels 10 respectively with the grounding loads of the right wheels 10 larger than the grounding loads of the left wheels 10 respectively, the wheel speeds Vw of the right wheels 10 are higher than the wheel speeds Vw of the left wheels 10 respectively (in other words, the slip rates S of the left wheels 10 are higher than the slip rates S of the right wheels 10 respectively). Therefore, as shown in FIG. 5, the wheel speeds Vw of the respective wheels 10 tend to change as described above with the passage of time from the time point t0. Incidentally, the vehicle 1 deflects leftward in this example.

In an example of the control according to the present embodiment of the disclosure, a time point t1 shown in FIG. 5 is equivalent to a time point when the ECU 40 definitely determines that there is a situation where the wheel speed Vw of the rear-right wheel 10RR is higher than the wheel speed Vw of the rear-left wheel 10RL. A period from the time point t0 to the time point t1 is equivalent to a time that is needed for the ECU 40 to ascertain the slip rates S of the respective rear wheels 10R after the start of braking. More specifically, in the present embodiment of the disclosure, the slip rate S of each of the wheels 10 is sequentially calculated on a predetermined cycle (e.g., at intervals of 6 ms). The aforementioned period is equivalent to a time that is needed to average fluctuations in the slip rates S that are sequentially calculated. Accordingly, the adjustment of the braking pressures of the respective rear wheels 10R through high-speed EBD is technically started at the time point t1.

At the time point t1, the slip rate S of each of the rear-right wheel 10RR and the rear-left wheel 10RL is lower than the target slip rate St, although there is a difference between the slip rate S of the right wheel and the slip rate S of the left wheel. Therefore, according to high-speed EBD, a two-wheel pressure increase demand is made. However, the ECU 40 performs the following process instead of immediately meeting this two-wheel pressure increase demand. That is, at the time point t1, the rear-right wheel 10RR on the low slip rate S side (i.e., the high wheel speed Vw side) is equivalent to the rear wheel located on the outside during the occurrence of current deflection of the vehicle 1, and the rear-left wheel 10RL on the other side is equivalent to the rear wheel located on the inside during the occurrence of the deflection. Thus, the ECU 40 allows the braking pressure of the rear-right wheel 10RR to be increased, and prohibits the braking pressure of the rear-left wheel 10RL from being increased.

As a result of the start of the process of allowing the braking pressure of only the rear-right wheel 10RR to be increased at the time point t1, the wheel speed Vw of the rear-right wheel 10RR whose braking pressure is allowed to be increased falls (the slip rate S thereof increases), and approaches the wheel speed Vw (the slip rate S) of the rear-left wheel 10RL whose braking pressure is prohibited from being increased, as shown in FIG. 5. A time point t2 shown in FIG. 5 is equivalent to a time point when the wheel speed Vw of the rear-right wheel 10RR coincides with the wheel speed Vw of the rear-left wheel 10RL (i.e., a time point when the slip rate S of the rear-right wheel 10RR and the slip rate S of the rear-left wheel 10RL coincide with each other). At the time point t2, the ECU 40 ends the process of allowing the braking pressure of only the rear-right wheel 10RR to be increased.

In a period from the time point t1 to the time point t2, the braking pressure of only the rear-right wheel 10RR located on the outside during the occurrence of the current deflection is allowed to be increased. Thus, the difference between the braking force of the outer wheel (the rear-right wheel 10RR) and the braking force of the inner wheel (the rear-left wheel 10RL) is greater than when the braking pressures of both the wheels are increased. Thus, an anti-spin moment for counterbalancing the deflection is effectively generated, so the braking stability of the vehicle 1 can be enhanced. Besides, the longitudinal forces (the braking forces) of the rear wheels 10R can be enhanced due to an increase in the braking pressure of the rear-right wheel 10RR, so the deceleration performance of the vehicle 1 can be enhanced. Besides, the amount of the aforementioned deflection decreases with the passage of time toward the time point t2. Then, due to a decrease in the amount of deflection, the difference between the loads of the rear-right wheel 10RR and the rear-left wheel 10RL decreases as well.

The time point t2 is also equivalent to a time point when the preceding deflection (leftward deflection in the example shown in FIG. 5) is eliminated. After the time point t2, the vehicle 1 deflects in the opposite direction (deflects rightward in the example shown in FIG. 5). That is, the time point t2 is equivalent to a time point when the deflection direction of the vehicle 1 is reversed. The deflection direction is reversed for the following reason. That is, in the period from the time point t1 to the time point t2, while the amount of the initial deflection decreases, the braking pressure of the rear-right wheel 10RR whose braking pressure is allowed to be increased rises, with the passage of time. Then, after the time point t2, the wheel speed Vw of the rear-right wheel 10RR becomes lower than the wheel speed Vw of the rear-left wheel 10RL. As a result, the vehicle 1 deflects rightward. That is, the deflection direction of the vehicle 1 is reversed.

In the example shown in FIG. 5, the ECU 40 holds the braking pressures of both the rear-right wheel 10RR and the rear-left wheel 10RL during the passage of a predetermined time T from the time point t2 to a time point t3. That is, the braking pressures of both the rear-right wheel 10RR and the rear-left wheel 10RL are prohibited from being increased or reduced during the passage of the predetermined time T. This predetermined time T is a period that is regarded as a dead zone in changing over the rear wheel 10R whose braking pressure is allowed to be increased as the deflection direction is reversed. The predetermined time T can be set as, for example, a time equivalent to a cycle of unsprung vibrations of the vehicle 1 (about 150 msec).

In the example shown in FIG. 5, at the time point t3, the ECU 40 resumes the process of allowing the braking pressure of only one of the rear wheels 10R to be increased. At the time point t3, as opposed to the period preceding the time point t2, the rear-left wheel 10RL on the low slip rate S side (i.e., the high wheel speed Vw side) is equivalent to the rear wheel located on the outside during the occurrence of the current deflection of the vehicle 1, and the rear-right wheel 10RR on the other side is equivalent to the rear wheel located on the inside during the occurrence of the deflection. Therefore, the ECU 40 allows the braking pressure of the rear-left wheel 10RL to be increased, and prohibits the braking pressure of the rear-right wheel 10RR from being increased.

As a result of the start of the process of allowing the braking pressure of only the rear-left wheel 10RL to be increased at the time point t3, the wheel speed Vw of the rear-left wheel 10RL whose braking pressure is allowed to be increased falls (the slip rate S thereof increases), and approaches the wheel speed Vw (the slip rate S) of the rear-right wheel 10RR whose braking pressure is prohibited from being increased, as shown in FIG. 5. The process of allowing the braking pressure of only the rear-left wheel 10RL to be increased is continued until a time point when the wheel speed Vw of the rear-left wheel 10RL coincides with the wheel speed Vw of the rear-right wheel 10RR (i.e., a time point when the slip rate S of the rear-right wheel 10RR and the slip rate S of the rear-left wheel 10RL coincide with each other) t4.

According to the above-mentioned process during a period from the time point t3 to the time point t4, when the braking force of the rear-left wheel 10RL becomes larger than the braking force of the rear-right wheel 10RR through an increase in the braking pressure of only the rear-left wheel 10RL, an anti-spin moment is effectively generated during this period as well. Besides, even in the case where the braking pressure of only the rear-left wheel 10RL is increased, when the braking force of the rear-right wheel 10RR has a certain magnitude at the time point t2, the braking force of the rear-left wheel 10RL cannot be made larger than the braking force of the rear-right wheel 10RR in some cases at least in the early phase of the present period. However, even in such a case, the braking pressure of the outer wheel (the rear-left wheel 10RL) is enhanced more than in the example in which the braking pressures of both the wheels are allowed to be increased during the present period, so the amount of the currently occurring deflection can be reduced with the passage of time. Therefore, the braking stability of the vehicle 1 can be enhanced even during the present period, by increasing the braking pressure of only the rear-left wheel 10RL. Besides, the longitudinal forces (the braking forces) of the rear wheels 10R can be enhanced through an increase in the braking pressure of the rear-left wheel 10RL, so the deceleration performance of the vehicle 1 can be enhanced during the present period as well.

As is the case with the above-mentioned time point t2, the time point t4 is equivalent to a time point when the deflection direction of the vehicle 1 is reversed. After the time point t4, the vehicle 1 deflects in the opposite direction (deflects leftward again in the example shown in FIG. 5). Besides, the aforementioned predetermined time T is provided as a period following the time point t4, according to the same concept as the period following the time point t2.

At a time point t5 after the passage of the predetermined time T from the time point t4, the ECU 40 resumes the process of allowing the braking pressure of only one of the rear wheels 10R to be increased. The process in the period following the time point t5 is the same as the above-mentioned process following the time point t1.

As described with reference to FIG. 5, when there is a two-wheel pressure increase demand during the performance of high-speed EBD according to the present embodiment of the disclosure, the process of allowing the braking pressure of only the rear wheel 10R located on the outside during the occurrence of deflection of the vehicle 1 to be increased is performed while the relevant rear wheels 10R are replaced with each other according to a result of a comparison between the slip rate S (the wheel speed Vw) of the rear-right wheel 10RR and the slip rate S (the wheel speed Vw) of the rear-left wheel 10RL during braking. In other words, when there is a two-wheel pressure increase demand during the performance of high-speed EBD, the braking pressure of one of the rear wheels 10R and the braking pressure of the other rear wheel are alternately increased. Incidentally, as this process progresses, the maximum value of the difference between the slip rates S of the rear-right wheel 10RR and the rear-left wheel 10RL that is created during the period in which the braking pressure of one of the rear wheels 10R is allowed to be increased decreases. Then, the slip rate S of the rear-right wheel 10RR and the slip rate S of the rear-left wheel 10RL eventually become substantially equal to each other. In the present embodiment of the disclosure, after the slip rate S of the rear-right wheel 10RR and the slip rate S of the rear-left wheel 10RL remain substantially equal to each other for a predetermined time, the braking pressures of both the wheels are allowed to be increased even during the performance of high-speed EBD.

(Process Performed by ECU)

Figure 6:
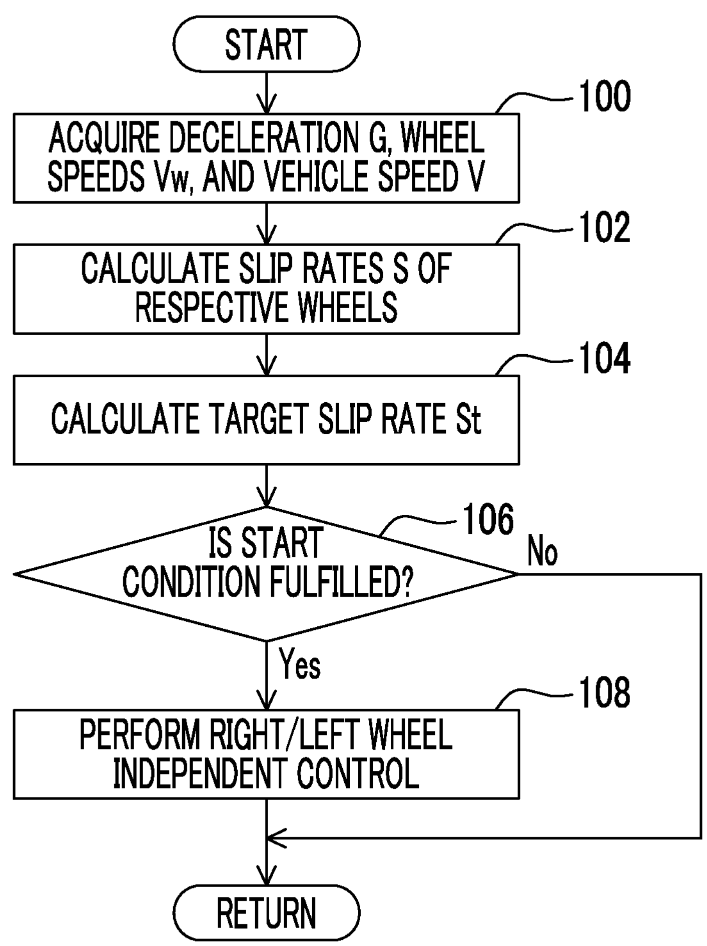
FIG. 6 is a flowchart showing a main routine that is executed by an ECU to realize braking control according to the first embodiment of the disclosure.

FIG. 6 is a flowchart showing a main routine that is executed by the ECU 40 to realize braking control according to the first embodiment of the disclosure. Incidentally, this main routine is repeatedly executed after the start of the vehicle 1.

In the main routine shown in FIG. 6, the ECU 40 first acquires the deceleration G, the wheel speeds Vw, and the vehicle speed V through the use of the acceleration sensor 46, the wheel speed sensors 42, and the vehicle speed sensor 44 respectively (step 100).

Subsequently, the ECU 40 calculates the slip rate S of each of the wheels 10, using the wheel speeds Vw acquired in step 100, the vehicle speed (the vehicle body speed) V acquired in step 100, and the aforementioned equation (1). Subsequently, the ECU 40 calculates an average of the slip rates S of the front-right wheel 10FR and the front-left wheel 10FL acquired in step 100 as the target slip rate St (step 104).

Subsequently, the ECU 40 determines whether or not a predetermined start condition for starting right and left wheel independent control is fulfilled (step 106). As will be described hereinafter, the present start condition is determined in advance based on the deceleration G acquired in step 100 and the vehicle speed V acquired in step 100. The start condition is so determined as to be fulfilled when the deceleration G is equal to a predetermined threshold. Then, this threshold is set differently depending on the vehicle speed V. More specifically, the above-mentioned control start value Gth1 is used as the aforementioned threshold in the low-speed range where the vehicle speed V is lower than a predetermined value Vth (the low-speed setting). On the other hand, the control start value Gth2 that is smaller than Gth1 is used as the aforementioned threshold in the high-speed range where the vehicle speed V is equal to or higher than the predetermined value Vth. Besides, in the high-speed range, the control start value Gth2 that is used as the aforementioned threshold decreases as the vehicle speed V rises (the high-speed setting). According to this setting of the control start value Gth1 and the control start value Gth2, right and left wheel independent control (i.e., high-speed EBD) is started at a timing when the smaller deceleration G is reached in the high-speed range than in the low-speed range.

If it is determined in step 106 that the start condition is not fulfilled, the ECU 40 swiftly ends the current processing cycle. In this case, a brake hydraulic pressure corresponding to a depression force of the brake pedal 22 is supplied to the wheel cylinder 28*a* of each of the wheels 10. More specifically, brake hydraulic pressures (i.e., braking pressures) that are adjusted such that braking forces corresponding to a predetermined longitudinal distribution are obtained and that the same braking force is obtained in the lateral direction of the front wheels 10F and in the lateral direction of the rear wheels 10R respectively are supplied to the wheel cylinders 28*a* of the wheels 10 respectively.

On the other hand, if it is determined in step 106 that the start condition is fulfilled, the ECU 40 performs right and left wheel independent control (step 108). Specifically, in the present step 108, the following subroutine shown in FIG. 7 is executed.

FIG. 7 is a flowchart showing the subroutine of a process regarding right and left wheel independent control in step 108 shown in FIG. 6. Incidentally, this subroutine is activated as soon as the result of the determination in step 106 shown in FIG. 6 becomes affirmative. This subroutine is repeatedly executed while the result of the determination in step 106 remains affirmative. Besides, this subroutine is individually executed for each of the rear-right wheel 10RR and the rear-left wheel 10RL.

In the subroutine shown in FIG. 7, the ECU 40 first calculates a deviation ΔS (=St−S) between the target slip rate St and the actual slip rate S (calculated in step 102) of the rear wheel 10R for which the current subroutine is activated (hereinafter referred to as "a self-wheel") (step 200).

Subsequently, the ECU 40 calculates a controlled variable ΔP of the braking pressure of the self-wheel (step 202). As described already, the controlled variable ΔP is calculated in such a manner as to increase as the deviation ΔS of the slip rate increases. Subsequently, the ECU 40 determines whether or not the controlled variable ΔP calculated in step 202 is equal to zero (step 204). The controlled variable ΔP is equal to zero when the deviation ΔS is equal to zero, namely, when the slip rate S of the self-wheel coincides with the target slip rate St. Therefore, it is understood that there is no need to adjust the braking pressures of the rear wheels 10R when the controlled variable ΔP is equal to zero. Incidentally, in step 204, the ECU 40 may determine whether or not the controlled variable ΔP is substantially equal to zero.

If the result of the determination in step 204 is affirmative (if the controlled variable ΔP is equal to zero), the ECU 40 swiftly ends the current processing cycle. On the other hand, if the result of the determination in step 204 is negative, the ECU 40 determines whether or not the sign of the controlled variable ΔP of the self-wheel and the sign of the controlled variable ΔP of the other rear wheel 10R (hereinafter referred to as "a non-self-wheel") are different from each other (step 206).

The result of the determination in step 206 is affirmative when the controlled variable ΔP of the self-wheel is a positive value and the controlled variable ΔP of the non-self-wheel is a negative value (i.e., there is a demand to increase the braking pressure of the self-wheel and there is a demand to reduce the braking pressure of the non-self-wheel), or in the opposite case. If the result of the present determination is affirmative, the ECU 40 proceeds to step 208, and allows the braking pressure of the self-wheel to be controlled (increased or reduced).

On the other hand, if the result of the determination in step 206 is negative (i.e., if the sign of the controlled variable ΔP of the self-wheel and the sign of the controlled variable ΔP of the non-self-wheel are identical to each other), the ECU 40 determines whether or not the signs of the controlled variables ΔP of the self-wheel and the non-self-wheel are positive (i.e., whether or not there is a two-wheel pressure increase demand) (step 210). As a result, if the result of the present determination is negative, namely, if the controlled variables ΔP of the self-wheel and the non-self-wheel are negative values (i.e., if there is a two-wheel pressure reduction demand), the ECU 40 proceeds to step 208, and allows the braking pressure of the self-wheel to be controlled (reduced).

On the other hand, if the result of the determination in step 210 is affirmative (i.e., if there is a two-wheel pressure increase demand), the ECU 40 determines whether or not the controlled variable ΔP of the self-wheel in the current processing cycle is larger than the controlled variable ΔP of the non-self-wheel at the same timing (step 212). If the result of the determination in step 212 is affirmative (i.e., if the controlled variable ΔP of the self-wheel is larger than the controlled variable ΔP of the non-self-wheel), the self-wheel is the rear wheel 10R on the low slip rate S side (i.e., the high wheel speed Vw side), so it can be determined that the self-wheel is equivalent to the rear wheel 10R located on the outside during the occurrence of the current deflection of the vehicle 1.

The ECU 40 determines whether or not the above-mentioned predetermined time T has passed from an immediately preceding time point when the result of the determination in step 212 for the self-wheel becomes affirmative (step 214). As a result, if the result of the present determination is negative, the ECU 40 holds the braking pressures of both the wheels (i.e., the self-wheel and the non-self-wheel) (step 216). More particularly, when the process for the self-wheel proceeds to step 216, the ECU 40 holds the braking pressure of the non-self-wheel regardless of the result of the process for the non-self-wheel at the same timing. In other words, in this case, the braking pressures of both the wheels are prohibited from being controlled (increased or reduced).

On the other hand, if it is determined in step 214 that the predetermined time T has passed, the ECU 40 allows the braking pressure of the self-wheel to be controlled (increased) (step 218). Thus, when there is a two-wheel pressure increase demand, the braking pressure of only the rear wheel 10R located on the outside during the occurrence of the current deflection of the vehicle 1 is enhanced. In the present embodiment of the disclosure, as an example of the control of the braking pressures through the process of step 218, the braking pressures are increased within such a range that the braking force of the relevant rear wheel 10R does not exceed the ideal braking force distribution. Incidentally, according to the processes of steps 214 to 216, the braking pressures of both the wheels are held for the predetermined time T in a period immediately following the start of braking (which is equivalent to the period from the time point t0 to the time point t1 in FIG. 5) as well.

Besides, if the result of the determination in step 212 is negative (i.e., if the controlled variable ΔP of the self-wheel is equal to or smaller than the controlled variable ΔP of the non-self-wheel), the ECU 40 determines, based on a result of a comparison between the current vehicle speed V and the predetermined value Vth, whether or not the current vehicle speed range is the high-speed range (step 220). As a result, if it is determined that the current vehicle speed range is the high-speed range, the ECU 40 determines whether or not the controlled variable ΔP of the self-wheel and the controlled variable ΔP of the non-self-wheel coincide with each other and these controlled variables ΔP have been coincident with each other for a predetermined time T' or more (step 222). Incidentally, in step 222, it may be determined whether or not the controlled variable ΔP of the self-wheel and the controlled variable ΔP of the non-self-wheel substantially coincide with each other, and a period in which the controlled variables ΔP substantially coincide with each other may be compared with the predetermined time T'. That is, a dead zone may be provided as to the determination on whether or not the controlled variable ΔP of the self-wheel and the controlled variable ΔP of the non-self-wheel coincide with each other. Then, more particularly, the determination on whether or not the controlled variable ΔP of the self-wheel and the controlled variable ΔP of the non-self-wheel substantially coincide with each other can be made based on, for example, whether or not the absolute values of the controlled variable ΔP of the self-wheel and the controlled variable ΔP of the non-self-wheel are smaller than a predetermined threshold K.

If the result of the determination in step 222 is negative, the ECU 40 prohibits the braking pressure of the self-wheel from being controlled (increased) (step 224). Thus, when there is a two-wheel pressure increase demand, the braking pressure of the rear wheel 10R located on the inside during the occurrence of the current deflection of the vehicle 1 is prohibited from being increased. Besides, even in the case where the controlled variable ΔP of the self-wheel and the controlled variable ΔP of the non-self-wheel are equal to each other (i.e., the deviation ΔS between the slip rate S of the self-wheel and the slip rate S of the non-self-wheel remains the same) although the predetermined time T' has not passed, the braking pressure of the self-wheel is prohibited from being increased. Moreover, in this case, the braking pressure of the non-self-wheel is also prohibited from being increased in the same subroutine that is separately executed for the non-self-wheel.

On the other hand, if the result of the determination in step 222 is affirmative, it can be determined that the slip rate S of the rear-right wheel 10RR and the slip rate S of the rear-left wheel 10RL stably assume the same value. Thus, in this case, the ECU 40 allows the braking pressure of the self-wheel to be controlled (increased) (step 226). Besides, in this case, the ECU 40 also performs the process of step 226 in the same subroutine that is separately executed for the non-self-wheel. Therefore, according to the processes of steps 220, 222, and 226, when the slip rate S of the rear-right wheel 10RR and the slip rate S of the rear-left wheel 10RL stably assume the same value due to the progress of braking from the high-speed range, the braking pressures of both the wheels are allowed to be increased.

On the other hand, if it is determined in step 220 that the current vehicle speed range is the low-speed range, the ECU 40 allows the braking pressure of the self-wheel to be controlled (increased) (step 228). In this case, the braking pressure of the non-self-wheel whose controlled variable ΔP is larger than that of the self-wheel is also allowed to be increased in the same subroutine that is separately executed for the non-self-wheel. Accordingly, the braking pressures of both the wheels are allowed to be increased in the low-speed range.

(Effect of Control According to First Embodiment)

First of all, right and left wheel independent control in the low-speed range where the vehicle speed V is lower than the predetermined value Vth will be described. According to the main routine shown in FIG. 6, "the low-speed setting" that uses the relatively large control start value Gth1 is used in right and left wheel independent control that is performed in the low-speed range. Besides, in right and left wheel independent control according to the present embodiment of the disclosure, the average of the slip rates S of the front-right wheel 10FR and the front-left wheel 10FL is used as the target slip rate St regardless of whether the vehicle is in the low-speed range or the high-speed range. Right and left wheel independent control can be performed while appropriately making the braking force distribution to the rear wheels 10R close to the ideal braking force distribution, by using this target slip rate St under the low-speed setting. As a result, right and left wheel independent control is likely to be performed in such a manner as to lower the braking force of the inner wheel (i.e., the rear wheel on the grounding load decrease side) 10R while enhancing the braking force of the outer wheel (i.e., the rear wheel on the grounding load increase side) 10R. Therefore, an anti-spin moment is likely to be appropriately applied to each of the rear-right wheel 10RR and the rear-left wheel 10RL, so high braking stability of the vehicle 1 can be secured. Incidentally, the braking stability of the vehicle 1 is more likely to be secured in the low-speed range than in the high-speed range. Therefore, in the subroutine shown in FIG. 7, when there is a two-wheel pressure increase demand, the braking pressures of both the wheels are not prohibited from being increased in the low-speed range, as opposed to the high-speed range.

Subsequently, the high-speed range where the vehicle speed V is equal to or higher than the predetermined value Vth will be described. When the start condition (step 106) is fulfilled in the high-speed range, right and left wheel independent control corresponding to high-speed EBD is performed. In high-speed EBD, "the high-speed setting" that uses the control start value Gth2 smaller than the control start value Gth1 is used. Thus, an environment in which the above-mentioned "rear-wheel small braking force characteristics" (the characteristics in which the braking force distribution to the rear wheels 10R is more sufficiently reduced with respect to the ideal braking force distribution in comparison with the low-speed actual braking force distribution line L1) can be realized can be created.

In addition, according to the subroutine shown in FIG. 7, when there is a two-wheel pressure increase demand during the performance of high-speed EBD, the braking force of the rear wheel 10R located on the outside during the occurrence of deflection of the vehicle 1 resulting from braking is enhanced by increasing the braking pressure of the rear wheel 10R. Furthermore, in this case, the braking force of the rear wheel 10R located on the inside during the occurrence of the aforementioned deflection is prohibited from being increased, by prohibiting the braking pressure of the rear wheel 10R from being increased. Thus, the deceleration performance can be enhanced through an increase in the braking force of one of the rear wheels 10R, while securing the braking stability of the vehicle 1 by effectively (stably) generating an anti-spin moment for reducing the deflection of the vehicle 1. Thus, when high-speed EBD in which the above-mentioned rear wheel small braking force characteristics are the basic characteristics is performed while using the average of the slip rates S of the front-right wheel 10FR and the front-left wheel 10FL as the target slip rate St, the securement of the braking stability of the vehicle 1 and further enhancement of the deceleration performance can be favorably made compatible with each other.

Besides, according to the subroutine shown in FIG. 7, when the deflection direction of the vehicle 1 is reversed during the performance of high-speed EBD, the braking pressures of both the rear-right wheel 10RR and the rear-left wheel 10RL are held, and the braking forces of both the wheels are held, until the predetermined time T passes from the time point of reversal of the deflection direction. Thus, when the deflection direction is reversed, the rear wheel 10R whose braking pressure is allowed to be increased can be changed over while restraining the control of the braking pressures from being destabilized. Still further, in the case where the predetermined time T is a time equivalent to the cycle of unsprung vibrations of the vehicle 1 (about 150 msec) as in the example of the present embodiment of the disclosure, the rear wheel 10R whose braking pressure is allowed to be increased can be changed over while eliminating the influence of the cycle of unsprung vibrations.

Furthermore, according to the above-mentioned process of step 218, when there is a two-wheel pressure increase demand, the braking force of the target one of the rear wheels 10R whose braking pressure is to be increased is increased within such a range as not to exceed the ideal braking force distribution. Thus, the braking force of one of the rear wheels 10R can be enhanced while restraining the braking stability of the vehicle 1 from decreasing as a result of the braking forces of the rear wheels that become too large.

By the way, in the above-mentioned first embodiment of the disclosure, it is determined which one of the rear-right wheel 10RR and the rear-left wheel 10RL is the rear wheel 10R located on the outside during the occurrence of deflection of the vehicle 1 resulting from braking, based on the magnitudes of the controlled variables $\Delta P$ of the braking pressures of the rear-right wheel 10RR and the rear-left wheel 10RL (see step 212 in FIG. 7). However, the determination in step 212 may be made according to a manner other than the above-mentioned one, for example, according to the following manner. That is, a direction of deflection of the vehicle 1 may be determined through the use of the yaw rate sensor 50, and it may be specified which one of the rear-right wheel 10RR and the rear-left wheel 10RL is the rear wheel located on the outside at the time of the occurrence of deflection in the determined direction. Besides, the slip rate S of the rear wheel 10R located on the outside during the occurrence of deflection is lower than the slip rate S of the other rear wheel 10R. Therefore, the magnitudes of the slip rates S of the rear-right wheel 10RR and the rear-left wheel 10RL may be compared with each other, and it may be determined that the rear wheel 10R on the low slip rate S side is the rear wheel 10R located on the outside during the occurrence of deflection. Furthermore, as described already, the controlled variable $\Delta P$ increases as the deviation $\Delta S$ (=St−S) of the slip rate increases. Therefore, the determination in step 212 may be made through the use of the deviation $\Delta S$ of the slip rate, instead of applying the method in which the controlled variable $\Delta P$ is used.

Besides, in right and left wheel independent control according to the above-mentioned first embodiment of the disclosure, the slip rate S is used as an example of the slip degree. However, right and left wheel independent control according to the disclosure may be performed to control the braking forces of the rear-right wheel and the rear-left wheel independently of each other such that the slip degree of each of the rear-right wheel and the rear-left wheel becomes equal to a target slip degree. For example, instead of the slip rate S, the slip amount (i.e., a difference that is obtained by subtracting each of the wheel speeds Vw from the vehicle body speed V) may be used as the slip degree. Besides, the target slip degree in the low-speed range according to the disclosure is not strictly limited to the average of the slip degrees of the front-right wheel and the front-left wheel, but may be a value close to the average.

Besides, in the above-mentioned first embodiment of the disclosure, the brake device 20 capable of controlling the braking forces of the four wheels 10 of the vehicle 1 independently of one another is mentioned as an example. However, braking control according to the disclosure is applicable to a vehicle that is equipped with a brake device capable of controlling the braking forces of at least the rear-right wheel and the rear-left wheel independently of each other.

Incidentally, in the above-mentioned first embodiment of the disclosure, the control start value Gth1 used under the low-speed setting may be regarded as an example of "the first predetermined value" in the disclosure, and the control start value Gth2 used under the high-speed setting may be regarded as an example of "the second predetermined value" in the disclosure. The processing procedure of the subroutine shown in FIG. 7, which is executed by the ECU 40, may be regarded as an example of "the braking pressure control process" in the disclosure, and the predetermined time T may be regarded as an example of "the predetermined time from the time point of reversal" in the disclosure.

What is claimed is:

1. A braking control apparatus for a vehicle, the vehicle being equipped with a brake device configured to control braking pressures of a rear-right wheel and a rear-left wheel independently of each other, the braking control apparatus comprising:

a structure configured to perform a control that includes performing right and left wheel independent control for controlling the braking pressures of the rear-right wheel and the rear-left wheel independently of each other such that a slip degree of each of the rear-right wheel and the rear-left wheel approaches a target slip degree as an average of slip degrees of a front-right wheel and a front-left wheel, wherein the braking control apparatus is configured to in a low-speed range of the vehicle, start the right and left wheel independent control when a deceleration of the vehicle is equal to or larger than a first predetermined value, and in a high-speed range of the vehicle, start the right and left wheel independent control when the deceleration is equal to or larger than a second predetermined value that is smaller than the first predetermined value, the high-speed range being higher range in speed than the low-speed range, and the right and left wheel independent control that is started in the high-speed range includes a braking pressure control process that increases the braking pressure of the rear wheel located on an outside during occurrence of deflection of the vehicle resulting from braking and that prohibits the braking pressure of the rear wheel located on an inside during occurrence of the deflection from being increased, when there is a demand to increase the braking pressures of both the rear-right wheel and the rear-left wheel.

2. The braking control apparatus for the vehicle according to claim 1, wherein the braking control apparatus is configured to hold the braking pressures of both the rear-right wheel and the rear-left wheel until a predetermined time passes from a time point of reversal of a deflection direction of the vehicle, when the deflection direction of the vehicle is reversed during performance of the right and left wheel independent control in the high-speed range.

3. The braking control apparatus for the vehicle according to claim 1, wherein the braking control apparatus is configured to increase the braking pressure of a target one of the rear wheels whose braking pressure is to be increased through the braking pressure control process, within such a range that a braking force of the target one of the rear wheels does not exceed a predetermined braking force distribution regarding braking forces of the front-right wheel and the front-left wheel and braking forces of the rear-right wheel and the rear-left wheel.

4. The braking control apparatus for the vehicle according to claim 1, wherein the braking control apparatus is configured to determine that a speed of the vehicle is in the low-speed range when the speed of the vehicle is lower than a predetermined speed, and determine that the speed of the vehicle is in the high-speed range when the speed of the vehicle is equal to or higher than the predetermined speed.

5. The braking control apparatus for the vehicle according to claim 2, wherein the braking control apparatus is configured to, when the deflection direction of the vehicle is reversed during performance of the right and left wheel independent control in the high-speed range, increase a braking force of the rear wheel located on the outside during occurrence of deflection of the vehicle after reversal of the deflection direction of the vehicle, and prohibit the braking pressure of the rear wheel located on the inside during occurrence of deflection after reversal of the deflection direction from being increased, after the predetermined time passes from the time point of reversal of the deflection direction.

6. A braking control apparatus for a vehicle, the vehicle being equipped with a brake actuator having a circuit, the brake actuator configured to control braking pressures of a rear-right wheel and a rear-left wheel independently of each other, the braking control apparatus comprising:

an electronic control unit that is electrically connected to the brake actuator, wherein the electronic control unit is configured to perform right and left wheel independent control for controlling the braking pressures of the rear-right wheel and the rear-left wheel independently of each other such that a slip degree of each of the rear-right wheel and the rear-left wheel approaches a target slip degree as an average of slip degrees of a front-right wheel and a front-left wheel, through use of the brake actuator, the electronic control unit is configured to, in a low-speed range of the vehicle, start the right and left wheel independent control when a deceleration of the vehicle is equal to or larger than a first predetermined value, and, in a high-speed range of the vehicle, start the right and left wheel independent control when the deceleration is equal to or larger than a second predetermined value that is smaller than the first predetermined value, the high-speed range being higher range in speed than the low-speed range, and the right and left wheel independent control that is started in the high-speed range includes a braking pressure control process that increases the braking pressure of the rear wheel located on an outside during occurrence of deflection of the vehicle resulting from braking and that prohibits the braking pressure of the rear wheel located on an inside during occurrence of the deflection from being increased, when there is a demand to increase the braking pressures of both the rear-right wheel and the rear-left wheel.

7. The braking control apparatus for the vehicle according to claim 6, wherein the electronic control unit is configured to hold the braking pressures of both the rear-right wheel and the rear-left wheel until a predetermined time passes from a time point of reversal of a deflection direction of the vehicle, when the deflection direction of the vehicle is reversed during performance of the right and left wheel independent control in the high-speed range.

8. The braking control apparatus for the vehicle according to claim 6, wherein the electronic control unit is configured to increase the braking pressure of a target one of the rear wheels whose braking pressure is to be increased through the braking pressure control process, within such a range that a braking force of the target one of the rear wheels does not exceed a predetermined braking force distribution regarding braking forces of the front-right wheel and the front-left wheel and braking forces of the rear-right wheel and the rear-left wheel.

9. The braking control apparatus for the vehicle according to claim 6, wherein the electronic control unit is configured to determine that a speed of the vehicle is in the low-speed range when the speed of the vehicle is lower than a predetermined speed, and determine that the speed of the vehicle is in the high-speed range when the speed of the vehicle is equal to or higher than the predetermined speed.

10. The braking control apparatus for the vehicle according to claim 7, wherein the electronic control unit is configured to, when the deflection direction of the vehicle is reversed during performance of the right and left wheel independent control in the high-speed range, increase a braking force of the rear wheel located on the outside during occurrence of deflection of the vehicle after reversal of the deflection direction of the vehicle, and prohibit the braking pressure of the rear wheel located on the inside during occurrence of deflection after reversal of the deflection direction from being increased, after the predetermined time passes from the time point of reversal of the deflection direction.

* * * * *